(12) United States Patent
Okamoto et al.

(10) Patent No.: US 6,851,737 B2
(45) Date of Patent: Feb. 8, 2005

(54) VEHICLE WINDSHIELD MOUNTING STRUCTURE

(75) Inventors: Yutaka Okamoto, Wako (JP); Yuji Kikuchi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/449,457

(22) Filed: May 30, 2003

(65) Prior Publication Data

US 2003/0227192 A1 Dec. 11, 2003

(30) Foreign Application Priority Data

Jun. 10, 2002 (JP) ........................................ 2002-169182

(51) Int. Cl.$^7$ ................................................ B60J 1/00
(52) U.S. Cl. .................... 296/84.1; 296/96.22; 296/201
(58) Field of Search ...................... 296/84.1, 92, 96.21, 296/96.22, 146.15, 187.03, 187.04, 187.05, 201

(56) References Cited

U.S. PATENT DOCUMENTS 3,282,014 A * 11/1966 Bamford et al. ............ 296/201
5,906,697 A * 5/1999 Hasegawa et al. .......... 296/201

FOREIGN PATENT DOCUMENTS

JP         04019136 A      1/1992

* cited by examiner

Primary Examiner—Lori L. Coletta
(74) Attorney, Agent, or Firm—Merchant & Gould P.C.

(57) ABSTRACT

A windshield mounting structure includes A-pillars for mounting a windshield and cracking inducers provided at the A-pillars. The cracking inducers cause cracking in the windshield when an external force greater than a given force acts on the windshield from the vehicle outside. The cracking in the windshield allows the windshield to move in its entirety or in part toward a passenger compartment, absorbing impact in collision.

6 Claims, 9 Drawing Sheets

VEHICLE WINDSHIELD MOUNTING STRUCTURE

FIELD OF THE INVENTION

The present invention relates to a vehicle windshield mounting structure for mitigating impact on collision objects colliding with windshields from the front of vehicles.

BACKGROUND OF THE INVENTION

As this kind of windshield, a laminated safety glass consisting of an annealing glass, a resin interlayer bonded to the interior-side surface of the annealing glass and an impermeable film bonded to the interior-side surface of the resin interlayer is known as disclosed, for example, in Japanese Patent Laid-Open Publication No. HEI-4-19136.

Figure 9A:
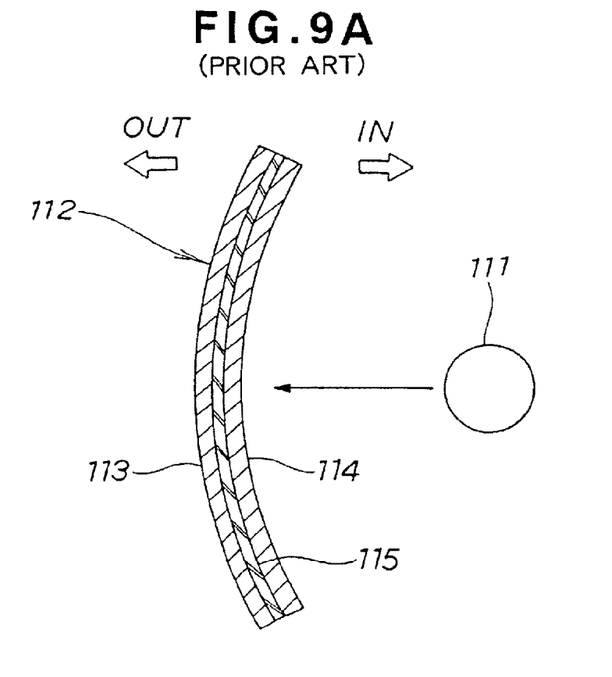
FIGS. 9A and 9B are cross-sectional views of the conventional windshield.
Figure 9B:
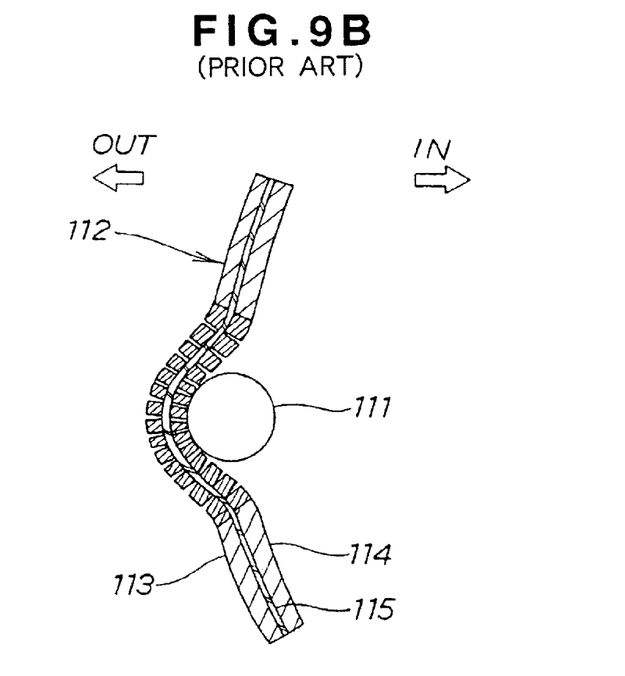

As another example of such a windshield, a windshield shown in FIGS. 9A and 9B is known. These figures illustrate a state in which a collision object is colliding with a windshield from the interior of a passenger compartment. In the figures, OUT indicates the outside of the passenger compartment and IN the inside of the passenger compartment.

FIG. 9A illustrates a state in which a collision object 111 is heading toward a windshield 112. The windshield 112 is made from a glass having two glasses 113 and 114 curved from the passenger compartment toward the vehicle outside, bonded together with an interlayer 115 (hereinafter referred to as a "laminated glass").

The laminated safety glass in HEI-4-19136 or the windshield 112 shown in FIG. 9A takes into account the safety of vehicle passengers, and mitigates impact on the head of a passenger hitting against the laminated safety glass or the windshield 112 upon a vehicle collision. However, no consideration is given to the safety of pedestrians, that is, collision objects from the outside of the vehicle compartment toward the laminated safety glass or the windshield 112.

In FIG. 9B, when the collision object 111 hits on the windshield 112, the windshield 112 is partly broken, mitigating the impact of collision. However, as described above, the windshield 112 does not allow for impact from the vehicle outside. Further, the windshield 112 has a shape curved outward of the passenger compartment, that is, a so-called "arch" shape in cross section, and is thus more unbreakable against a load from the outside of the passenger compartment than from the inside of the passenger compartment.

Further, recent years' trends toward short-nose vehicles with passenger compartments expanded in space and slant-nose vehicles with front end portions inclined downward to reduce air resistance in high-speed travel result in increased collisions from the vehicle front toward windshields. On the other hand, under an increased rate of seatbelt wearing and the widespread adoption of airbags, importance is being attached to consideration to the safety of pedestrians in addition to the safety of vehicle passengers. In other words, it is desired to improve a vehicle windshield mounting structure so as to effectively mitigate the impact of collision with windshields from the outside of passenger compartments.

SUMMARY OF THE INVENTION

In the present invention, there is provided a vehicle windshield mounting structure, which comprises: a windshield; mounting members for mounting the windshield; and cracking inducers provided at the mounting members, respectively, for causing cracking in the windshield by stress concentration when an external force greater than a given force acts on the windshield from the outside of a passenger compartment; in which, the cracking caused in the windshield allows the windshield to move in its entirety or in part inward into the passenger compartment.

When a collision object collides with the windshield from the vehicle front, the cracking inducers cause cracks in the windshield in the vicinities of the windshield mounting members, allowing the windshield to move in its entirety or in part toward the vehicle interior, thereby further absorbing the impact in collision as compared with conventional windshields and mitigating impact received by the collision object.

Each of the cracking inducers in this invention preferably comprises a protrusion oriented toward the windshield. To extend a part in the vicinity of the mounting member for the windshield into the protrusion, for example, facilitates the formation of the protrusion and also prevents increase in the number of components.

Further, each of the cracking inducers in this invention preferably comprises a holder for retaining a peripheral portion of the windshield. The holders can increase the force of restraining the peripheral portions of the windshield, facilitating stress concentration and the occurrence of cracking in the peripheral portions of the windshield.

Furthermore, in this invention, each of the cracking inducers preferably comprises supporters arranged discontinuously at the mounting member, for supporting the windshield. Thus, supporting the windshield with the discontinuously-arranged supporters causes difference in the amount of strain between windshield supporting portions and non-supporting portions, thereby facilitating the occurrence of cracking in the vicinities of the windshield supporters.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
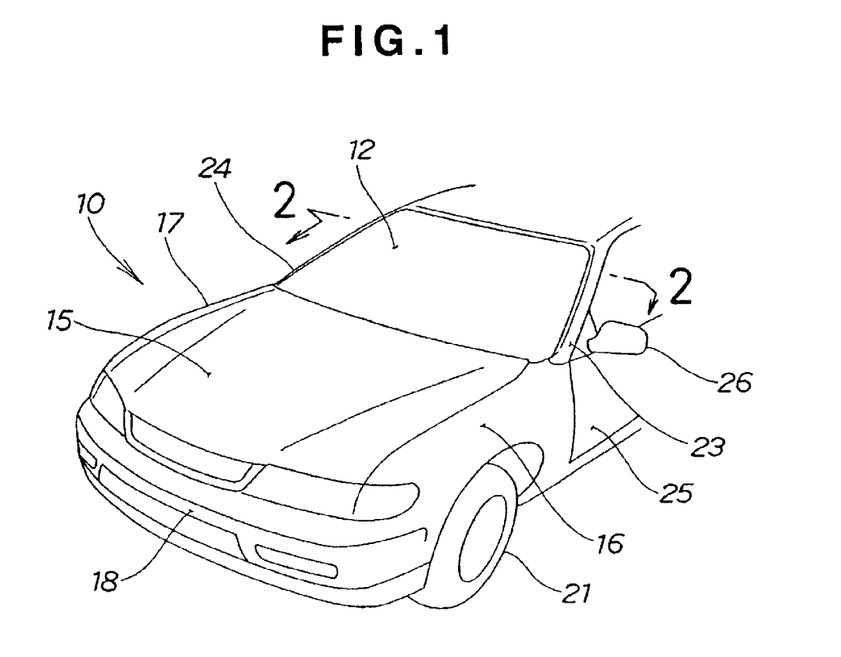
FIG. 1 is a perspective view of a front portion of a vehicle employing a windshield mounting structure according to the present invention.

Initial reference is made to FIG. 1 illustrating in perspective the front of a vehicle employing a windshield mounting structure according to the present invention. A vehicle 10 has a windshield 12 at the front of a passenger compartment. Reference numeral 15 denotes a hood covering an upper portion of an engine compartment, 16 and 17 left and right front fenders, 18 a front bumper, 21 a front wheel (a front wheel on the other side is not shown), 23 and 24 left and right A-pillars, 25 a front door, and 26 a door mirror.

Figure 2:
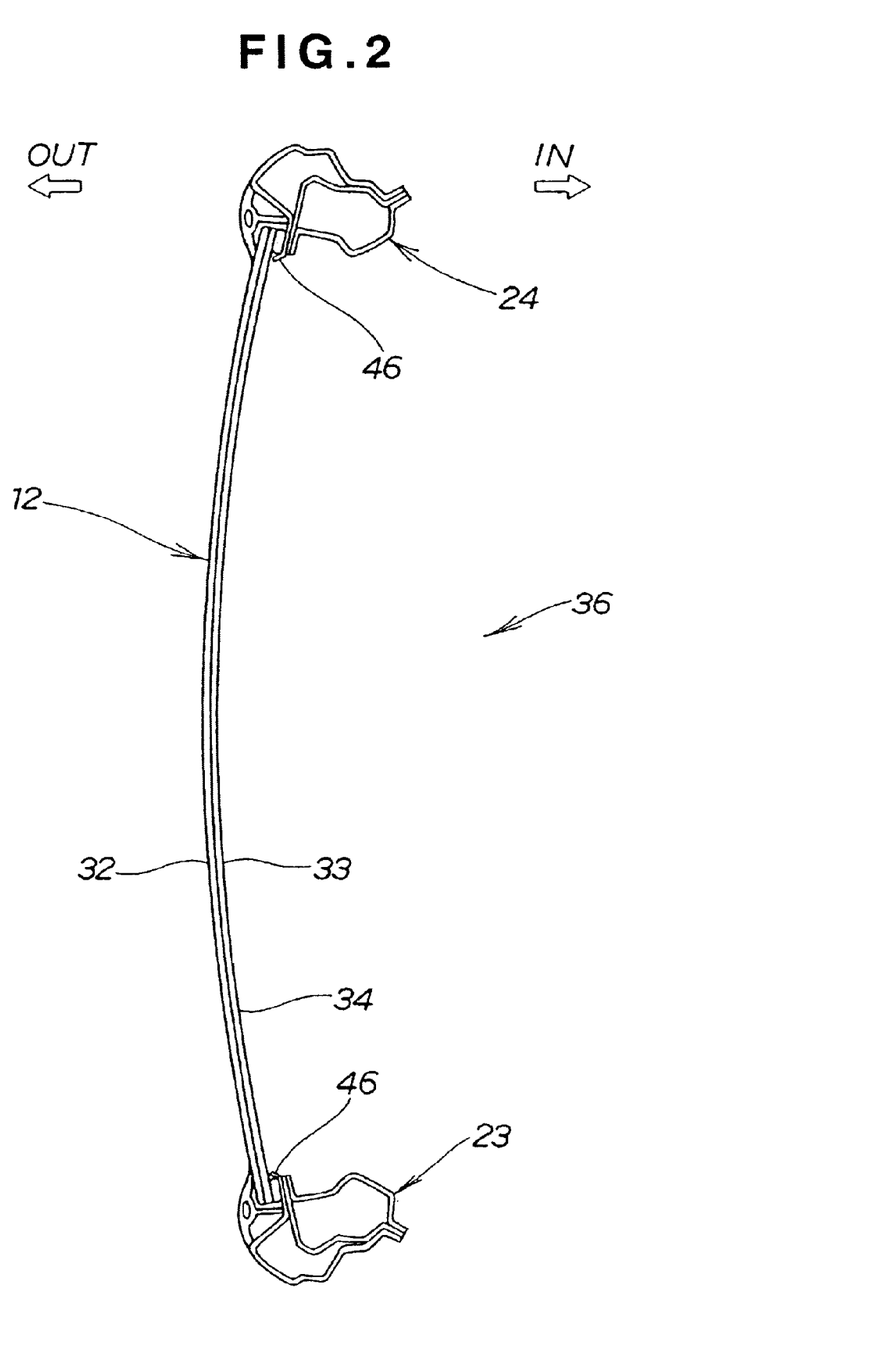
FIG. 2 is a cross-sectional view according to a first embodiment, taken along line 2—2 in FIG. 1.

Next, reference is made to FIG. 2 showing the windshield 12 mounted between the left and right A-pillars 23 and 24.

The windshield 12 is a laminated glass consisting of an outer glass 32 arranged outside of the vehicle, an inner glass 33 arranged inside of a passenger compartment 36, and an interlayer 34 interposed between the outer glass 32 and the inner glass 33, bonding the outer glass 32 and the inner glass 33 together. As will be described below, when an external force greater than an external force of a given magnitude acts on the windshield 12 from the outside of the passenger compartment 36, stress is concentrated in the vicinities of the A-pillars 23 and 24 as mounting members for the windshield 12, causing cracking in the windshield 12, and thereby allowing the windshield 12 to move in its entirety or in part inward into the passenger compartment 36. Thus, when an object collides from the outside of the passenger compartment 36, the impact of collision is effectively mitigated.

Figure 3:
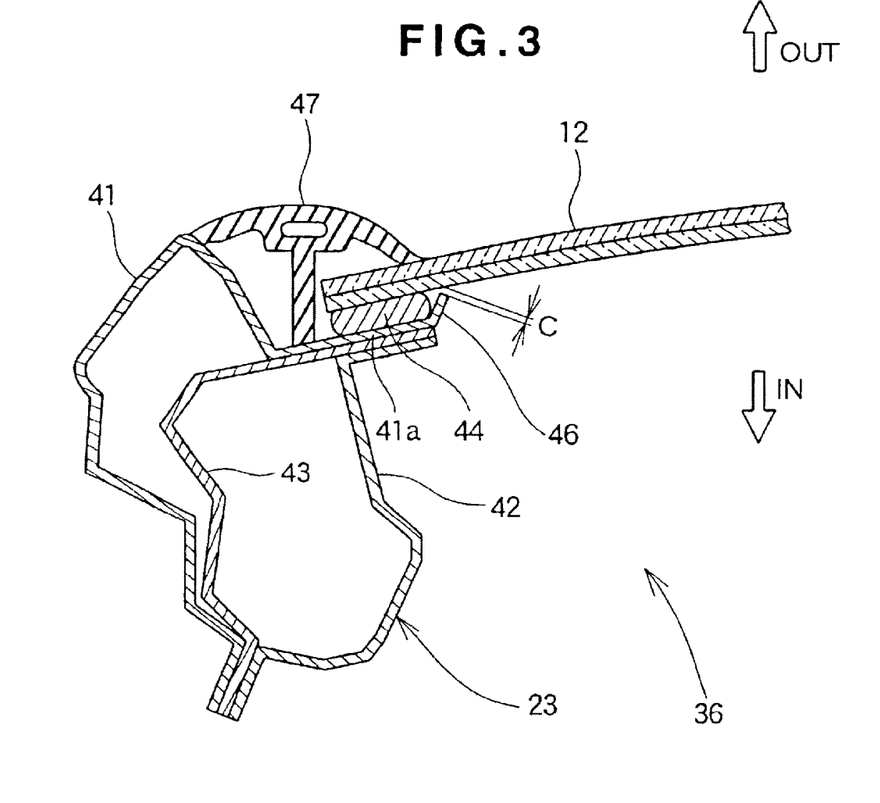
FIG. 3 is an enlarged cross-sectional view illustrating a portion of the windshield mounting structure according to the first embodiment shown in FIG. 2.

FIG. 3 illustrates a windshield mounting structure according to a first embodiment of the present invention. The A-pillar 23 consists of an outer panel 41, an inner panel 42 disposed on the passenger compartment 36 side of the outer panel 41, and a reinforcing panel 43 mounted between the outer panel 41 and the inner panel 42. To a longitudinal end portion 41a of the outer panel 41, the windshield 12 is attached with an adhesive 44. The end portion 41a of the outer panel 41 has at its edge a protrusion 46 extending toward the inside surface of the windshield 12. The protrusion 46 serves as a cracking inducer for causing cracking in the windshield 12. A windshield molding 47 covers an end of the windshield 12.

Figure 3A:
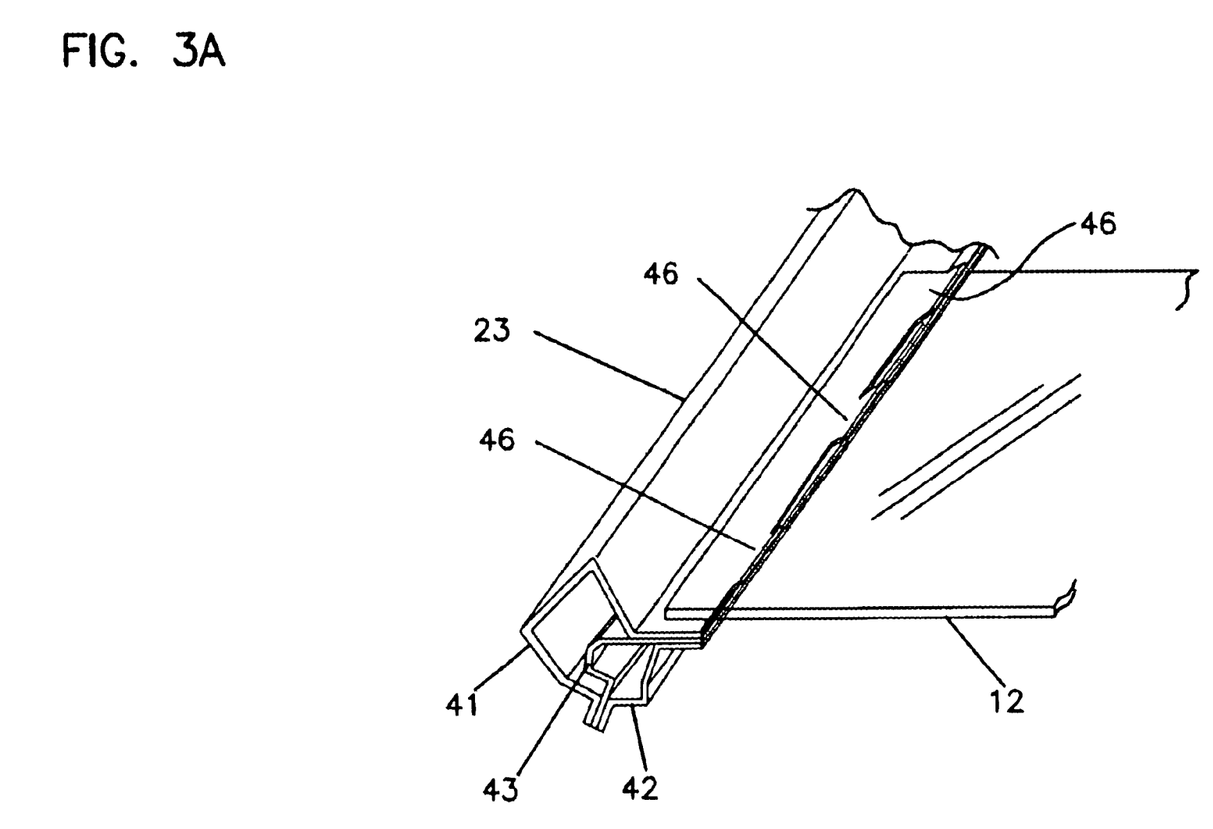
FIG. 3A is a perspective view of an alternative structure of the windshield mounting structure according to the first embodiment shown in FIG. 2.

The protrusion 46 is a portion integrally formed with the outer panel 41 and bent toward the windshield 12 in a continuous or discontinuous mater (see also FIG. 3A) at the edge of the outer panel 41.

C indicates a clearance between the distal end of the protrusion 46 and the inner surface of the windshield 12.

The A-pillar 24 shown in FIG. 2 is also provided with a protrusion 46 as described above.

Now the function of the windshield mounting structure according to the above-described first embodiment will be described with reference to FIGS. 4, 5A and 5B.

Figure 4:
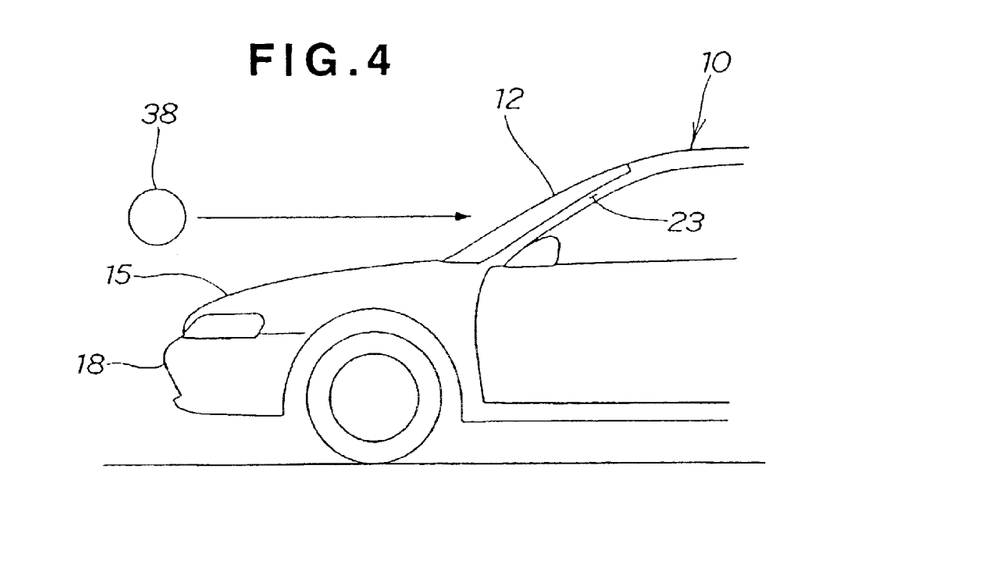
FIG. 4 is a diagram illustrating a state in which a collision object is colliding with a windshield from the front of the vehicle.
Figure 5A:
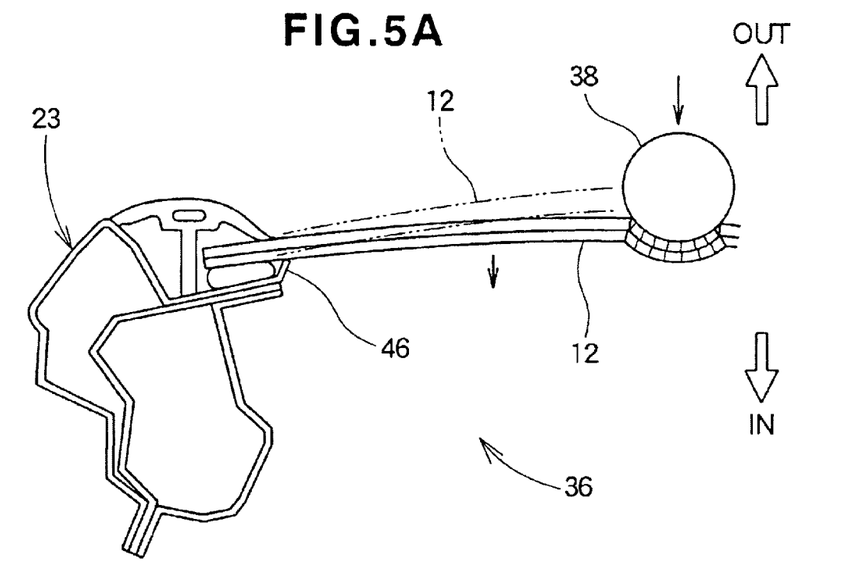
FIGS. 5A and 5B are diagrams illustrating a state in which the collision object collides with the windshield and a protrusion causes cracking in the windshield in the windshield mounting structure according to the first embodiment.
Figure 5B:
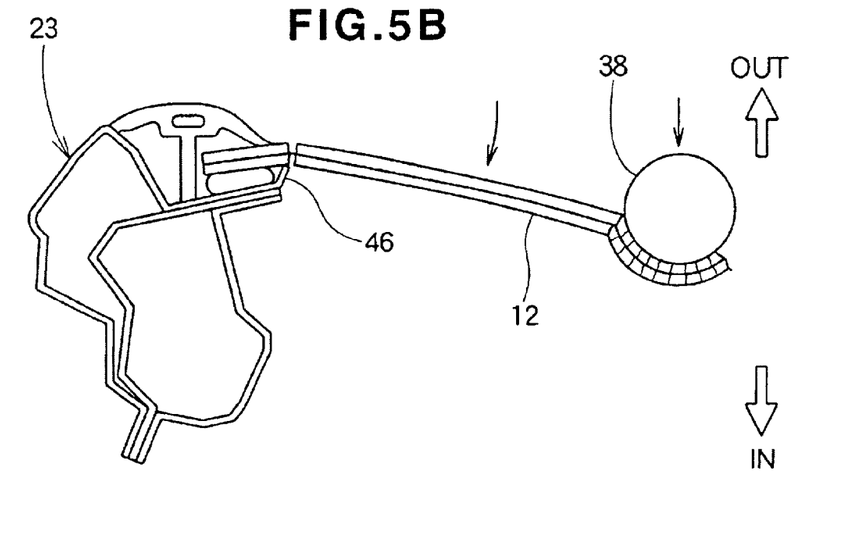

When a collision object 38 heads toward the windshield 12 from the front of the vehicle 10 as shown by an arrow in FIG. 4, and the collision object 38 collides with the windshield 12 as shown in FIG. 5A, for example, the impact causes the windshield 12 to flex inward into the passenger compartment 36, and the windshield 12 abuts against the protrusion 46. Stress is concentrated on the abutting portion of the windshield 12. As a result, as shown in FIG. 5B, cracking occurs at the stress concentration in the windshield 12, and a portion of the windshield 12 hit by the collision object 38 moves largely inward into the passenger compartment 36. This mitigates the impact in collision on the collision object 38.

As described above with FIGS. 3, 5A and 5B, the present invention is first characterized in that the windshield mounting structure of the vehicle 10 for mounting the windshield 12 at the front of the passenger compartment 36 has cracking inducers (e.g., protrusions 46) provided at mounting members for the windshield 12 for causing cracking in the windshield 12 by stress concentration when an external force larger than a given force acts on the windshield 12 from the outside of the passenger compartment 36, thereby to allow the windshield 12 to move in its entirety or in part inward into the passenger compartment 36.

When the collision object 38 collides with the windshield 12 from the outside of the passenger compartment 36, the cracking inducers cause cracks in the windshield 12 in the vicinities of the mounting members for the windshield 12, allowing the windshield 12 to move in its entirety or in part, thereby to further absorb the impact in collision as compared with conventional windshields and mitigate impact received by the collision object 38.

The present invention is secondly characterized in that cracking inducers are configured with the protrusions 46 oriented toward the windshield 12.

To extend a part in the vicinity of the mounting member for the windshield 12 such as the outer panel 41 of the A-pillar 23 into the protrusion 46, for example, facilitates the formation of the protrusion 46 and also prevents increase in the number of components.

Figure 6A:
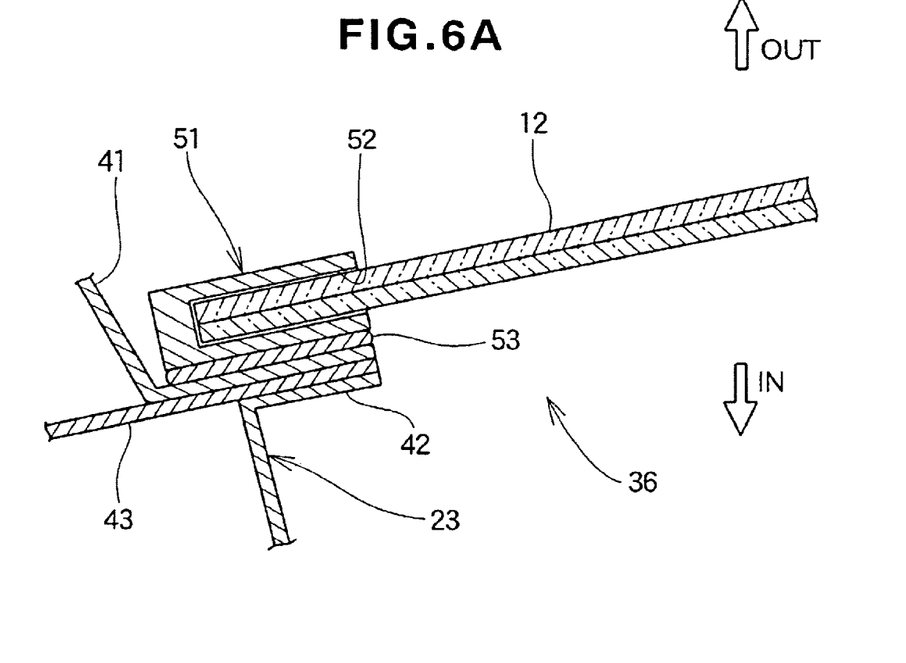
FIGS. 6A and 6B are cross-sectional views illustrating a windshield mounting structure according to a second embodiment of the present invention.
Figure 6B:
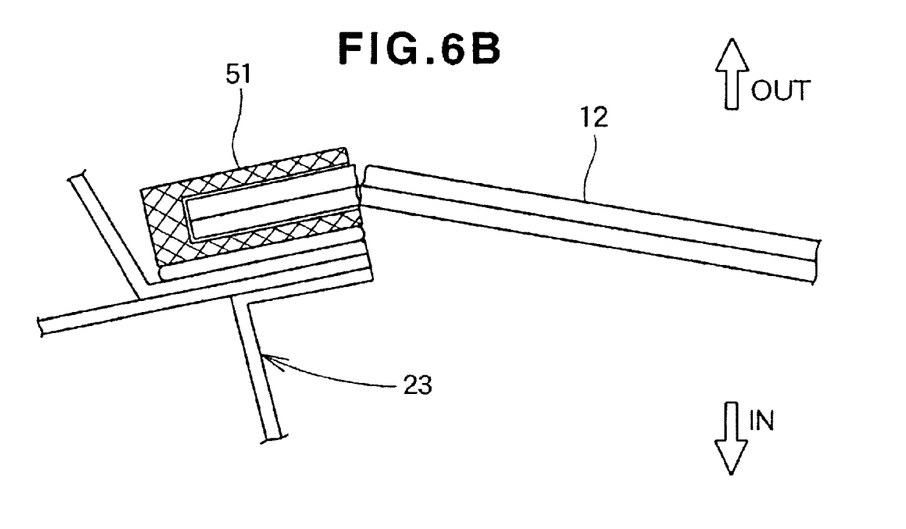

FIGS. 6A and 6B illustrate a windshield mounting structure according to a second embodiment of the present invention.

As shown in FIG. 6A, the windshield mounting structure according to the second embodiment has a holder 51 of a C shape in cross section attached to an A-pillar 23 with an adhesive 53. An edge of a windshield 12 is fitted into a groove 52 of the holder 51. The holder 51 is made from a steel or resin and serves as a cracking inducer for positively causing cracking in the windshield 12.

According to the mounting structure in the second embodiment, as compared with the case of only bonding the windshield 12 to the A-pillar 23 with an adhesive, the windshield 12 is mounted to the A-pillar 23 via the holder 51 so that the holder 51 can increase the force of restraining the windshield 12.

As shown in FIG. 6B, when an object collides with the windshield 12 from the front of the windshield 12, stress concentration occurs at a portion of the windshield 12 corresponding to the opening-side end of the holder 51, causing cracking in the windshield at that portion.

Figure 7:
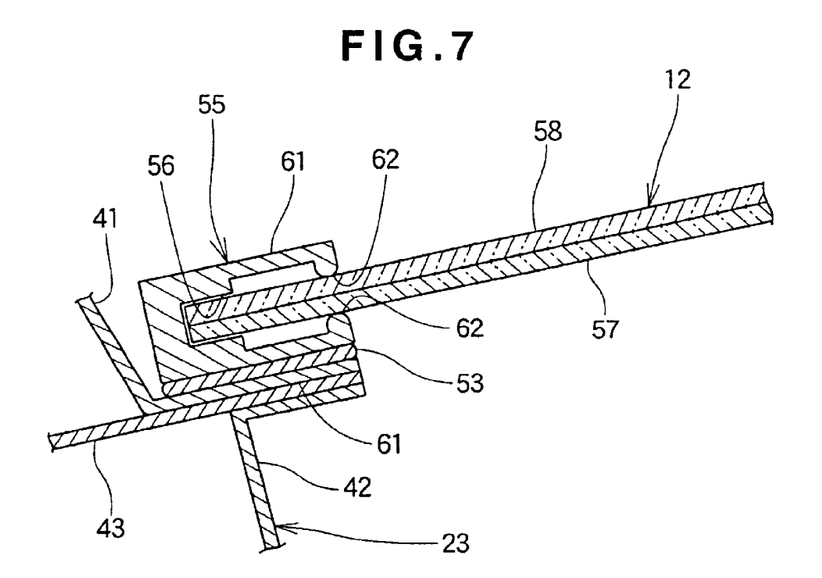
FIG. 7 is a cross-sectional view illustrating a windshield mounting structure according to a third embodiment of the present invention.

FIG. 7 illustrates a windshield mounting structure according to a third embodiment of the present invention.

A holder 55 in the third embodiment consists of a groove 56 into which an edge of a windshield 12 is inserted, extensions 61, 61 extended from the opening side of the groove 56 along an inner surface 57 and outer surface 58 of the windshield 12, distanced from the inner surface 57 and outer surface 58, and protrusions 62, 62 formed at the respective ends of the extensions 61, 61, abutting on the inner surface 57 and outer surface 58.

When an object collides with the windshield 12 from the outside of a passenger compartment 36, stress is concentrated on a portion of the windshield 12 held by the distal ends of the protrusions 62, 62 of the holder 55, facilitating the occurrence of cracking.

As described above, the present invention is thirdly characterized in that cracking inducers are configured with the holders 51 (see FIG. 6A) or holders 55 retaining peripheral portions of the windshield 12.

The holders 51 or holders 55 can increase the restraining force at the peripheral portions of the windshield 12 for facilitating stress concentration thereon, and facilitating the occurrence of cracking in the peripheral portions of the windshield 12.

Figure 8A:
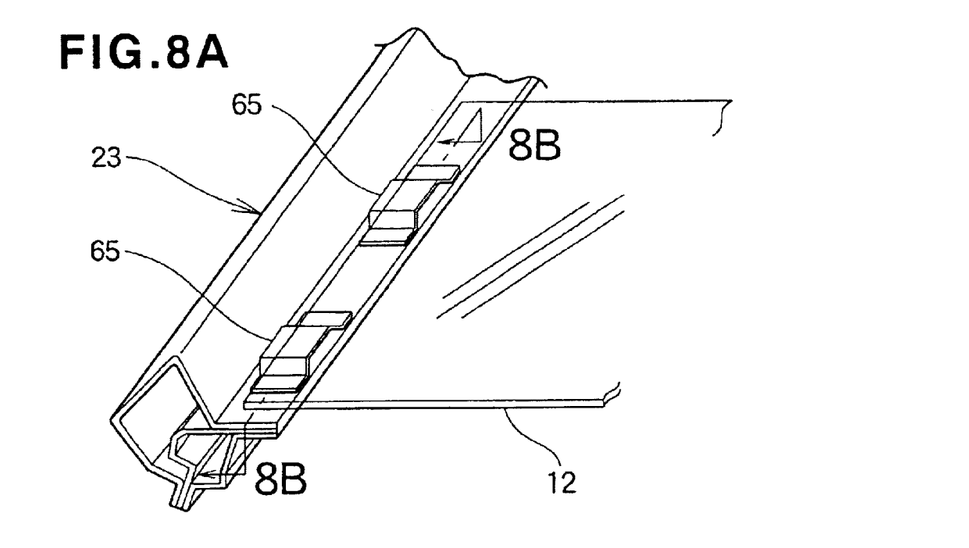
FIGS. 8A to 8C are cross-sectional views illustrating a windshield mounting structure according to a fourth embodiment of the present invention.
Figure 8B:
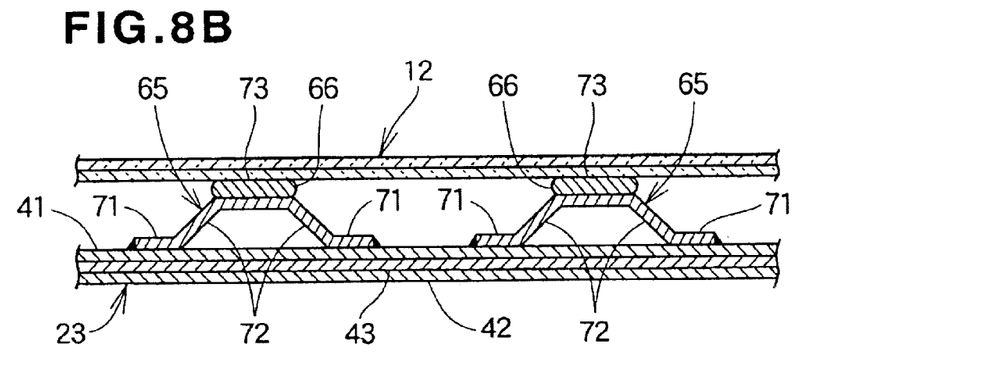
Figure 8C:
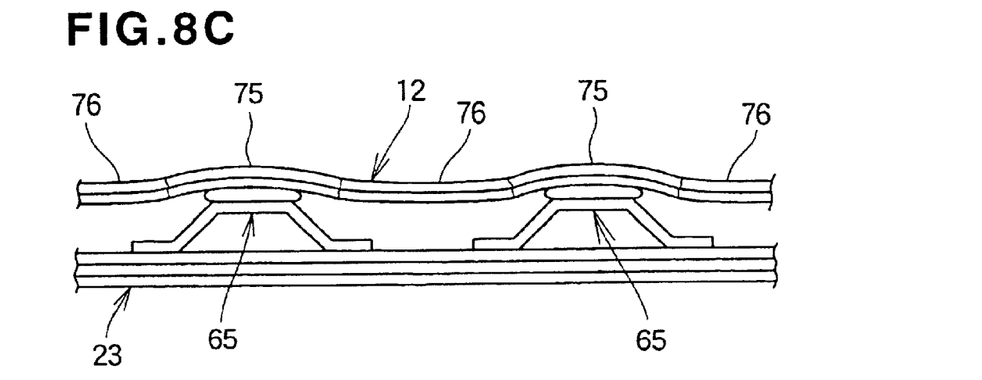

FIGS. 8A to 8C illustrate a windshield mounting structure according to a fourth embodiment of the present invention. FIG. 8A illustrates an example of attaching a plurality of glass supporters 65 as cracking inducers to A-pillars 23 and 24 (A-pillar 24 is not shown). The glass supporters 65 are bonded to a windshield 12 with an adhesive.

FIG. 8B illustrates the windshield 12 mounted on the glass supporters 65 provided at the A-pillar 24 with adhesives 66.

The glass supporters 65 each consist of bases 71, 71 welded to an outer panel 41 of the A-pillar 23, legs 72, 72 extended obliquely from the bases 71, 71, respectively, and a flat portion 73 connecting the distal ends of the legs 72, 72. The adhesive 66 is applied to the flat portion 73 to bond the windshield 12.

In FIG. 8C, when a collision object collides with the windshield 12 from the outside of a passenger compartment, the amount of strain in the windshield 12 at portions 75 supported by the glass supporters 65 differs from that at portions 76 unsupported. As a result, cracks due to the difference in the amount of strain occur in the windshield 12 at the boundaries between the supported portions 75 and the unsupported portions 76. The windshield 12 can thus largely flex, mitigating the impact in collision.

As described above, the present invention is fourthly characterized in that cracking inducers are configured with the glass supporters 65 discontinuously arranged at mounting members as supporters for supporting the windshield 12.

Supporting the windshield 12 by the discontinuously-arranged glass supporters 65 can cause difference in the amount of strain in the windshield 12 between the portions 75 supported by the glass supporters 65 and the portions 76 unsupported, thereby facilitating the occurrence of cracking in the vicinities of the glass supporters 65 for the windshield 12.

In the first embodiment, the protrusions 46 are integrally formed with the A-pillars 23 and 24, which is not limiting. Protrusions may be attached to the A-pillars 23 and 24 as separate members.

The glass supporters 65 according to the fourth embodiment are attached to the A-pillars 23 and 24 as separate members, which is not limiting. Glass supporters may be integrally formed with the A-pillars 23 and 24 in a discontinuous manner.

The present disclosure relates to the subject matter of Japanese Patent Application No. 2002-169182, filed Jun. 10, 2002, the disclosure of which is expressly incorporated herein by reference in its entirety.

What is claimed is:

1. A vehicle windshield mounting structure, comprising:
   a windshield;
   mounting members for mounting said windshield; and
   cracking inducers each provided discontinuously at said mounting members, respectively, and engageable with part of an inner surface of the windshield for causing cracking in said windshield by stress concentration created due to a difference in the amount of strain between said part and the remaining part of the windshield when an external force greater than a given force acts on said windshield from the outside of a passenger compartment; in which,
   said cracking caused in said windshield allows said windshield to move in its entirety or in part inward into said passenger compartment.

2. A windshield mounting structure as set forth in claim 1, wherein each of said cracking inducers comprises a protrusion oriented toward said windshield.

3. A windshield mounting structure as set forth in claim 1, wherein each of said cracking inducers comprises supporters.

4. A windshield mounting structure as set forth in claim 1, wherein said mounting members comprise a pillar having an inner panel facing the passenger compartment, an outer panel facing away from the passenger compartment and a reinforcing panel disposed between the inner and outer panels, the outer panel having a longitudinal edge on which an edge portion of the windshield is mounted, and each of said cracking inducers comprises a protrusion formed integrally with the longitudinal edge of the outer panel and oriented toward the inner surface of the windshield, the protrusion being disposed discontinuously along the longitudinal edge of the outer panel.

5. A vehicle windshield mounting structure, comprising:
   a windshield;
   mounting members for mounting said windshield, said mounting members comprising a pillar; and
   cracking inducers provided at said mounting members, respectively, for causing cracking in said windshield by stress concentration created due to a difference in the amount of strain between said part and the remaining part of the windshield when an external force greater than a given force acts on said windshield from the outside of a passenger compartment, wherein said cracking caused in said windshield allows said windshield to move in its entirety or in part inward into said passenger compartment, each of said cracking inducers comprising a holder attached to the pillar and having a groove in which an edge portion of the windshield is fitted.

6. A windshield mounting structure as set forth in claim 5, wherein said holder further has a pair of extensions extending integrally from an open end of the groove along the inner surface and an outer surface of the windshield, each of said extensions having a protrusion at a distal end thereof, the protrusion being abutment with a respective one surface of the windshield.

* * * * *